United States Patent
Kabbabe Malave et al.

(10) Patent No.: US 11,407,648 B2
(45) Date of Patent: Aug. 9, 2022

(54) (MELT-) EXTRUSION PROCESS FOR THE PREPARATION OF ALKALI METAL CARBONATE, BICARBONATE AND SESQUICARBONATE FORMULATIONS USING A MELTED FUNCTIONALIZING AGENT

(71) Applicant: Solvay SA, Brussels (BE)

(72) Inventors: Jorge Alejandro Kabbabe Malave, Bourg-la-Reine (FR); Thibaud Detoisien, Dombasle-sur-Meurthe (FR); Karine Cavalier, Uccle (BE)

(73) Assignee: Solvay SA, Brussels (BE)

( * ) Notice: Subject to any disclaimer, the term of this patent is extended or adjusted under 35 U.S.C. 154(b) by 969 days.

(21) Appl. No.: 16/093,114

(22) PCT Filed: Apr. 13, 2017

(86) PCT No.: PCT/EP2017/059009
§ 371 (c)(1),
(2) Date: Oct. 11, 2018

(87) PCT Pub. No.: WO2017/178623
PCT Pub. Date: Oct. 19, 2017

(65) Prior Publication Data
US 2021/0179438 A1    Jun. 17, 2021

(30) Foreign Application Priority Data
Apr. 13, 2016    (EP) .................... 16165117

(51) Int. Cl.
*C01D 7/38* (2006.01)
*C01D 7/10* (2006.01)
*C01D 7/14* (2006.01)

(52) U.S. Cl.
CPC .............. *C01D 7/38* (2013.01); *C01D 7/10* (2013.01); *C01D 7/14* (2013.01)

(58) Field of Classification Search
CPC .............. C01D 7/38; C01D 7/10; C01D 7/14
See application file for complete search history.

(56) References Cited

U.S. PATENT DOCUMENTS

| | | |
|---|---|---|
| 3,188,170 A | 6/1965 | Mantz et al. |
| 4,769,397 A | 9/1988 | Lapierre et al. |
| 5,411,750 A | 5/1995 | Lajoie et al. |
| 2001/0006677 A1* | 7/2001 | McGinity ............ A61K 9/0007 424/449 |
| 2014/0148572 A1 | 5/2014 | Zhao et al. |

FOREIGN PATENT DOCUMENTS

| | | | |
|---|---|---|---|
| CN | 104393077 A | 3/2015 | |
| EP | 1170256 A2 | 1/2002 | |
| WO | WO 94/28057 A1 | 12/1994 | |
| WO | WO-9428057 A1 * | 12/1994 | ............... C08J 9/08 |
| WO | WO 2007/071666 A1 | 6/2007 | |
| WO | WO 2014/096457 A1 | 6/2014 | |
| WO | WO 17/178625 A1 | 10/2017 | |

OTHER PUBLICATIONS

Fukuda M et al—Floating hot-melt extruded tablets for gastroretentive controlled drug release system—Journal of Controlled Release, Oct. 10, 2006 Elsevier, Amsterdam, NL vol. 115, No. 2,pp. 121-129—DOI: 10.1016/j.jconrel.2006.07.018.
Kameda T—Molecular structure of crude beeswax studied by solid-state super(13)C NMR—Journal of Insect Science 2004,vol. 4,p. 29. published online Aug. 30, 2004.
U.S. Appl. No. 16/093,116, Jorge Alejandro Kabbabe Malave et al, filed Oct. 11, 2018, WO 2017/178625.

* cited by examiner

*Primary Examiner* — Yong L Chu
(74) *Attorney, Agent, or Firm* — Osha Bergman Watanabe & Burton LLP

(57) ABSTRACT

The present invention relates to a process for preparing a formulation comprising an alkali metal salt selected from the group consisting of alkali metal bicarbonate salts, alkali metal carbonate salts, alkali metal sesquicarbonate salts and combinations thereof, wherein said process comprises the step of extruding a paste-like composition comprising a functionalizing agent and the metal salt. The invention furthermore relates to a formulation obtainable from said process and to the use of this formulation in various applications such as in plastic foaming or in food and feed leavening compositions.

9 Claims, No Drawings

(MELT-) EXTRUSION PROCESS FOR THE PREPARATION OF ALKALI METAL CARBONATE, BICARBONATE AND SESQUICARBONATE FORMULATIONS USING A MELTED FUNCTIONALIZING AGENT

CROSS-REFERENCE TO RELATED APPLICATIONS

The present application is a U.S. national stage entry under 35 U.S.C. § 371 of International Application No. PCT/EP2017/059009 filed Apr. 13, 2017, which claims priority benefit to European Application No. 16165117.9 filed on Apr. 13, 2016, the whole content of this application being incorporated herein by reference for all purposes.

FIELD OF THE INVENTION

The invention relates to a process for preparing a formulation comprising an alkali metal salt selected from alkali metal bicarbonate salts, alkali metal carbonate salts, alkali metal sesquicarbonate salts and combinations thereof by (melt-)extrusion of a paste-like composition obtained by admixing the alkali metal salt with a functionalizing agent and melting the resulting mixture or melting a functionalizing agent and mixing the melted functionalizing agent with the alkali metal salt or mixing the functionalizing agent with the alkali metal salt and melting the mixture during extrusion to obtain a paste-like composition. The invention further relates to a formulation comprising the alkali metal salt obtainable from said process and to the use of this formulation e.g., in food leavening compositions and as foaming agents for plastics.

PRIOR ART

Alkali metal bicarbonate particles, such as sodium bicarbonate particles and potassium bicarbonate particles, are known in the art. These products have many properties which make them interesting and extensively used in several technical fields, such as pharmaceutical industry, the feed and food industry, and the cosmetic industry.

The most common way to manufacture bicarbonate particles is crystallization by carbonization with carbon dioxide of a solution or suspension of the corresponding alkali metal (sodium or potassium carbonate for example) or a solution or suspension of the hydroxide of the corresponding alkali metal. It is also common to crystallize bicarbonates by controlled cooling of bicarbonate solutions or suspensions, or by evaporating the solvent of such solutions or suspensions.

For the industrial use of alkali metal bicarbonate particles control of specific properties of the particles is required, such as: decomposition temperature, or their dissolution time.

Methods to control some parameters of alkali metal bicarbonate particles, such as a bulk density are known in the art. For instance, U.S. Pat. No. 5,411,750 discloses a method of producing sodium bicarbonate powder with a bulk density between 70 and 500 kg/m$^3$. The particles are prepared by spray-drying a dilute aqueous solution or suspension of the bicarbonate with an alkali metal salt as additive.

WO 2014/096457 discloses a method for producing sodium bicarbonate particles by spray-drying of an aqueous solution comprising 1-10% by weight of sodium bicarbonate in an additive selected from the group consisting of magnesium salt, sodium alkyl benzene sulfonat and soybean lecithin.

The alkali metal bicarbonate particles produced by spray-drying are generally fine particles. Accordingly, in order to modify the shape of the particles, different unit operations need to be performed such as crystallization processes, grinding processed, drying processes and/or sieving processes. These procedural steps are expensive, time consuming and may not be suitable to produce specific particle shapes that are required for specific applications of the alkali metal bicarbonate.

In CN 104393077 A, a coating for a solar cell is disclosed, which is obtained by melting, extruding, granulating a composition comprising silicone, sodium bicarbonate, 3-chloropropyl-alkyne, urethane acrylate, a stabilizer and a surfactant, followed by the addition of further sodium bicarbonate. The concentration of sodium bicarbonate in the coating, as disclosed in the examples of CN 104393077 A, ranges from 9.6 to 12.3% by weight. However, this process appears to use sodium bicarbonate as a source for $Na_2O$, since melting is carried out at high temperatures, between 600 to 800° C., thereby releasing $CO_2$ under formation of $Na_2O$, making it necessary to add further sodium bicarbonate after the extrusion has been carried out.

In view of the above, there is still a need for a process for the preparation of an alkali metal carbonate, bicarbonate and sesquicarbonate formulations, which can easily be modified in terms of their shape and size, also enabling the adjustment of the porosity and the bulk density of the formulation. At the same time, it would be desirable if the formulation obtained from said process showed advantageous properties such as increased dissolution times, and $CO_2$ release temperatures of generally more than 80° C. and preferably less than 400° C., and a chemical reactivity that can be adjusted with respect to the desired application.

BRIEF SUMMARY OF THE INVENTION

It has been surprisingly found that an alkali metal salt selected from alkali metal bicarbonate salts, alkali metal carbonate salts, alkali metal sesquicarbonate salts and combinations thereof can be provided in a paste-like composition suitable for (melt-)extrusion by admixing the alkali metal salt with a functionalizing agent and melting the resulting mixture or melting a functionalizing agent and mixing the melted functionalizing agent with the alkali metal salt or mixing the functionalizing agent with the alkali metal salt and melting the mixture during extrusion to obtain a paste-like composition. By means of (melt-)extrusion, the paste paste-like composition can easily be modified with respect to its shape and size, porosity and bulk density to give an alkali metal salt formulation which shows excellent duration of dissolution and excellent $CO_2$ release properties can be obtained thereof by means of extruding the paste-like composition. Also, the chemical reactivity of the alkali metal salt formulation can be adjusted by means of selection of the functionalizing agent.

In view of the above, the present invention relates to:
Item 1. A process for preparing a formulation comprising an alkali metal salt selected from the group consisting of alkali metal bicarbonate salts, alkali metal carbonate salts, alkali metal sesquicarbonate salts and combinations thereof, wherein said process comprises the steps of:
(a1) melting a functionalizing agent to a temperature above the melting point of the functionalizing agent to obtain a melted functionalizing agent, and mixing the melted functionalizing agent with the alkali metal salt to obtain a paste-like composition; or (a2) mixing the functionalizing agent and the alkali metal salt to obtain a mixture, and heating the mixture to a temperature above the melting point of the functionalizing agent to melt the functionalizing agent within the mixture and to obtain a paste-like composition; or (a3) mixing the functionalizing agent and the alkali metal salt to obtain a mixture, and, to obtain the formulation, (b1) extruding or melt-extruding the paste-like composition obtained in step (a1) or (a2), or (b2) melt-extruding the mixture obtained in step (a3) at a temperature above the melting point of the functionalizing agent to melt the functionalizing agent to obtain a paste-like composition during extrusion, wherein the paste-like composition undergoing extrusion comprises at least 25% by weight of said alkali metal salt, based on the total weight of the composition undergoing extrusion, and the functionalizing agent.

Item 2. The process of item 1, wherein at steps (a1) or (a2) or (a3) the weight ratio of functionalizing agent is at least 20, more preferably at least 25, even more preferably at least 30, even more preferably at least 35 parts per 100 parts of alkali metal salt;

and wherein at step (b1) or (b2) the formulation is a powder, filaments or granules, comprising alkali metal salt particles and functionalizing agent.

Item 3. The process of items 1 or 2, comprising after step (b1) or (b2) the step:

(c) cooling the formulation to below the melting temperature of the functionalizing agent to obtain a cooled formulation in form of a powder, or cooled filaments or cooled granules of the alkali metal salt and the functionalizing agent.

Item 4. The process of any one of the preceding items, wherein the functionalizing agent is selected from the group consisting of oils, fats, resin acids and esters and salts thereof, fatty acids and esters and salts thereof, soaps, waxes, shellac, poly(methyl)methacrylates and combinations thereof, with the proviso that the functionalizing agent is not calcium stearate.

Item 5. The process of any one of the preceding items, wherein the melting point of the functionalizing agent is at least 0° C., and/or is at most 140° C., preferably at most 90° C.

Item 6. The process of any one of the preceding items, wherein the paste-like composition comprises alkali metal salt and 0.1-60% by weight, or 0.5-60% by weight, or 1-60% by weight, or 3-60% by weight, or 5-60% by weight, or 7-60% by weight, or 10-60% by weight, or 15-60% by weight, or 17-60% by weight, or 20%-57%, or even 23%-54% by weight of a fat, an oil, a resin acid or an ester or a salt thereof, a fatty acid or an ester or a salt thereof, a soap, a wax, shellac, or a poly(methyl)methacrylate and combinations thereof, based on the total weight of the composition undergoing extrusion.

Item 7. The process according to any one of items 4 to 6, wherein the functionalizing agent is, or comprises, an oil and/or a wax, and the oil comprises 12 to 22 carbons, and/or the wax comprises from 16 to 46 carbons.

Item 8. The process according to any one of items 4 to 7, wherein the functionalizing agent is, or comprises, a fatty acid that is a compound according to formula (I)

R—COOH (I), wherein R is a saturated or unsaturated C6 to C32 alkyl group, preferably a C12 to C18 alkyl group, more preferably a C12 to C16 alkyl group.

Item 9. The process according to any one of items 4 to 8, wherein the functionalizing agent is, or comprises, a resin acid that is a tricyclic diterpene carboxylic acid, preferably belonging to the abietane diterpene group.

Item 10. The process according to any one of items 4 to 9, wherein the functionalizing agent is, or comprises, beeswax.

Item 11. The process of any one of the preceding items, wherein the alkali metal salt used at step (a1) or (a2) or (a3) is made of particles, and the medium particle size (D50 in weight) of said particles is 10-300 μm, preferably 20-200 μm, more preferably 30-150 μm, more preferably 40-130 μm.

Item 12. The process of any one of the preceding items, wherein the alkali metal salt is a bicarbonate salt or a sesquicarbonate salt, in particular sodium bicarbonate or sodium sesquicarbonate.

Item 13. The process of any one of the preceding items, wherein at step (a1) or (a2) or (a3), a third compound selected among a mineral compound, an organic compound, and mixtures thereof, is added to the alkali metal salt or to the functionalizing agent to obtain the paste-like composition.

Item 14. The process of item 13, wherein the mineral compound is silica, sodium silicate or sodium silicate hydrate, calcium carbonate, and/or wherein the organic compound is citric acid.

Item 15. The process of any one of the preceding items, wherein at steps (a1) or (a2) or (a3) the weight ratio of functionalizing agent is at most 100 parts, preferably at most 70 parts, more preferably at most 60 parts, even more preferably at most 55 parts, per 100 parts of alkali metal salt.

Item 16. The process of any one of items 3 to 15, wherein the cooled filaments or granules are in a step (d) subsequently cut into pieces or grinded at a temperature below the melting temperature.

Item 17. The process of any one of the preceding items, wherein the extrusion is performed on a screw extruder, e.g., a single screw extruder or a twin screw extruder.

Item 18. The process of any one of the preceding items, wherein step (a1) comprises solidifying the paste-like composition, preferably by cooling said paste-like composition.

Item 19. The process of any one of the preceding items, wherein said melting in step (a1) comprises (i) mixing the functionalizing agent with a solvent (e.g., water) having a temperature above the melting temperature of the functionalizing agent, or (ii) mixing the functionalizing agent with a solvent (e.g., water) to obtain a dispersion and heating the dispersion to a temperature above the melting temperature of the functionalizing agent; wherein an emulsion comprising the functionalizing agent and the solvent is obtained.

Item 20. The process of item 19, further comprising removing said solvent (e.g., water) after the extrusion step.

Item 21. The process of any one of the preceding items, wherein the alkali metal salt or the alkali metal salt particles is (are) encapsulated by the functionalizing agent.

Item 22. An alkali metal salt formulation obtainable by an extrusion process according to any one of items 1 to 21, wherein the formulation comprises alkali metal salt and a functionalizing agent, and wherein the formulation is in the form of a powder, filaments or granules, wherein the granules have a spherical, cubic or cylindrical shape.

Item 23. An alkali metal salt formulation or the alkali metal salt formulation according to item 22, wherein the formulation comprises at least 40% by weight of an alkali metal bicarbonate, less than 10% by weight of an alkali metal carbonate, less than 10% by weight of water, and 0.1-60% by weight, or 0.5-60% by weight, or 1-60% by weight, or 3-60% by weight, or 5-60% by weight, or 7-60% by weight, or 10-60% by weight, or 15-60% by weight, or 17-60% by weight, or 20%-57%, or even 23%-54% by weight of a resin acid or an ester or a salt thereof, a fatty acid or an ester or a salt thereof, or a wax, each based on the total amount of the alkali metal salt formulation.

Item 24. The alkali metal salt formulation of item 23, wherein the formulation comprises at least 30%, preferably at least 50%, more preferably at least 60%, even more preferably at least 65%, even more preferably at least 70%, or at least 80% by weight of the alkali metal bicarbonate, based on the total amount of the alkali metal salt formulation.

Item 25. The alkali metal salt formulation of any one of items 22 to 24, wherein the formulation is in the form of filaments or granules having a diameter of at least 100 µm, preferably of at least 200 µm, more preferably of at least 500 µm, even more preferably of at least 1 mm.

Item 26. The alkali metal salt formulation of any one of items 22 to 25, wherein the formulation is in the form of filaments or granules having a diameter of at most 100 mm, preferably of at most 50 mm, more preferably of at most 5 mm, even more preferably of at most 2 mm.

Item 27. The alkali metal salt formulation of any one of items 22 to 26, wherein the formulation is in the form of filaments or granules having a length to diameter ratio of at least 0.4 and preferably of at most 4.

Item 28. The alkali metal salt formulation of item 27, wherein the formulation is in the form of granules obtained by a spheronization step such as melting spheronization, after extrusion.

Item 29. The alkali metal salt formulation of any one of items 22 to 28, wherein the alkali metal salt in the formulation shows a dissolution time of at least 30 seconds.

Item 30. The alkali metal salt formulation of any one of items 22 to 29, wherein the alkali metal salt is a bicarbonate or a sesquicarbonate salt and wherein the formulation shows a $CO_2$ release maximum temperature of at least 150° C., as determined by thermogravimetric analysis (TGA).

Item 31. The alkali metal salt formulation of any one of items 22 to 30, wherein the alkali metal salt or the alkali metal salt particles is (are) encapsulated by the functionalizing agent.

Item 32. Use of the alkali metal salt formulation according to any one of items 22 to 31 as detergent, as blowing or foaming agent for polymers, as agent for pharmaceutical applications, as exfoliating agent, as anti-parasitic agent, as cosmetic agent such as deodorizing agent, as leavening agent for food and feed, as agent for flue gas cleaning, as food and feed supplement additive or food and feed pH buffer, in particular for aquatic animals or for fish.

Item 33. A method for making products for one or more applications, such as detergence industry, polymer industry, pharmaceutical industry, cosmetic industry, feed and food industry, and/or flue gas cleaning, the method comprising using the alkali metal salt formulation according to any one of items 22 to 31 as detergent, as blowing or foaming agent for polymers, as agent or ingredient in pharmaceutical compositions, as exfoliating agent, as anti-parasitic agent, as cosmetic agent such as deodorizing agent, as leavening agent for food and feed, as a flue gas cleaning agent, as food and feed supplement additive or food feed pH buffer, in particular for aquatic animals or for fish.

Definitions

In the present description, wherein an element or composition is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components.

Further, it should be understood that elements and/or features of an apparatus, a process or method described herein can be combined in a variety of ways without departing from the scope and disclosures of the present teachings, whether explicit or implicit herein.

The term "alkali metal salt", as used herein, refers to alkali metal bicarbonate salts, alkali metal carbonate salts, alkali metal sesquicarbonate salts and combinations thereof.

The term "extrusion" or "extruding", as used herein, refers to a process in which a softened material, herein a paste-like composition as defined below, is forced through a shaped device, e.g., a syringe orifice or a die of an extruder device, in order to obtain a material in form of a powder, or of a certain shape, e.g., filaments or granules. The filaments or granules obtained from the extrusion process can be further milled in one embodiment of the present invention.

The extrusion process can e.g., carried out as a melt extrusion process.

The term "melt-extrusion" or "melt-extruding, as used herein, refers to an extrusion process, which is performed at a temperature above the melting point of the functionalizing agent as defined below.

The extrusion process can also be carried out by means of a continuous mixing/extrusion process, wherein the material is mixed and extruded in a low pressure, temperature-controlled, paddle-equipped twin screw instrument. A liquid or a melted additive can be sprayed on the material at any point during the process. The temperature applied in the continuous mixing/extrusion process can be in the range of −20 to 300° C. The residence time can be in the range from 2 to 20 minutes. The rotary speed of the shafts in the paddle-equipped twin screw instrument can be in the range of from 30 to 160 rpm.

Suitable continuous mixing/extrusion processors include processors, which allow mixing, kneading and extruding a homogenous mix of high-viscosity materials. Preferred continuous mixing/extrusion processors include twin screws and paddles that allow thorough and complete mixing, with co-rotating shafts and close clearances between the paddles as well as between the paddles and the barrel walls allowing for uniform mixing, performed in less time than with conventional mixers. Further preferred continuous processors allow high-volume applications with a capacity of from 1 kg to 10 tons per hour.

The term "functionalizing agent", as used herein, refers to a compound that is capable of improving at least one $CO_2$ release property of sodium bicarbonate when formulated with the sodium bicarbonate, relative to the sodium bicarbonate alone. For example, the functionalizing agent is capable of increasing the $CO_2$ release beginning temperature and/or the $CO_2$ release maximum temperature, determined in accordance with Example 2 and the present application. Preferably, the functionalizing agent is a compound as defined in item 4 described above.

A "paste-like composition", as referred to herein, is a composition comprising the alkali metal salt and the functionalizing agent, wherein the paste-like composition is suitable for being used in an extrusion process. Preferably, the paste-like composition is a paste or a gel. A "paste" or "gel" is a semi-solid suspension, which is mouldable if external forces are applied, e.g., external forces that occur during an extrusion process, but keeps its shape in the absence of external forces. The viscosity of the paste-like composition is preferably within a range of 5000 to 25000 mPa·s, more preferably 10000 to 20000 mPa·s as determined by rheological analysis at room temperature (25° C.) and a shear rate of 100 s$^{-1}$. The rheological analysis of the paste-like composition can be carried out using a rotational rheometer (e.g., "RheolabQC" from Anton PAAR).

The term "comprising" includes "consisting essentially of" and "consisting of".

The sign "%" refers to "weight percent" unless specifically stated otherwise. As used herein "bulk density" refers to loose bulk density and can be determined according to ASTM D7481-09 "method A" unless specifically stated otherwise. Tapped density can also be determined according to ASTM D7481-09 "method A" unless specifically stated otherwise.

As used herein "dissolution time" is measured with a conductivity meter diving cell in a beaker stirred with 1 liter (1000 ml±1 g) deionized water at 25° C.±0.5° C. The stirring speed is 350 rpm, the geometry of the stirrer (4 vertical blades) is: height 11 mm, diameter 42 mm. Each blade measures 20 mm in length and 10 mm in height. The beaker has a diameter of 100 mm. The gap between the blades and the bottom of the beaker is 10 mm. The conductivity meter is positioned at 40 mm of the stirrer axis and 20 mm under the liquid surface. A 10 g±0.05 g sample of the alkali metal bicarbonate formulation is introduced into the solution or suspension. Upon dissolution, the conductivity of the solution or suspension increases. The "dissolution time" is the time (starting with introduction of the formulation sample into the solution) required to reach 95% of the maximum value of the conductivity during dissolution of the formulation sample.

The phrase 'A and/or B' refers to the following selections: element A; or element B; or combination of elements A and B (A+B). The phrase 'A and/or B' is equivalent to at least one of A and B. The phrase 'A and/or B' equates to at least one of A and B.

In the present specification, the description of a range of values for a variable, defined by a bottom limit, or a top limit, or by a bottom limit and a top limit, also comprises the embodiments in which the variable is chosen, respectively, within the value range: excluding the bottom limit, or excluding the top limit, or excluding the bottom limit and the top limit.

In the present specification, the description of several successive ranges of values for the same variable also comprises the description of embodiments where the variable is chosen in any other intermediate range included in the successive ranges. Thus, for illustration purpose, when it is stated that "the element X is generally at least 10, advantageously at least 15", the present description also includes another embodiment where a new minimum can be selected between 10 and 15, for example: where "the element X is at least 11", or also where: "the element X is at least 13.74", etc.; 11 or 13.74 being values included between 10 and 15. Also for illustration purpose, when it is indicated that "the element X is generally at most 15, advantageously at most 10", the present description also includes another embodiment where a new maximum can be selected between 10 and 15.

In the present specification, when in an embodiment the choice of an element from a group of elements is described, the following embodiments are also explicitly described:
the choice of two or more elements from the group,
the choice of an element from a subgroup of elements consisting of the group of elements from which one or more elements have been removed.

The $CO_2$ release properties of the alkali metal bicarbonate formulation of the present invention can be determined by performing a thermogravimetric analysis (TGA) of a sample of the alkali metal bicarbonate formulation, measuring the weight loss of the sample in dependence of the temperature. The $CO_2$ release properties are characterized by the derivate value for weight loss depending on the temperature. The $CO_2$ release beginning temperature is the temperature where the derivate value for weight loss starts to raise. The $CO_2$ release maximum temperature is the temperature where the derivate value for weight loss is at maximum. Typically, heating is performed between 30° C. and 500° C. at a speed of 10° C./min on a sample of 15 mg of the formulation. Thermogravimetric analysis can e.g., be performed on an STD Q600 V20.9 Build 20 thermogravimetric analysis instrument (provided by TA Instruments).

DETAILED DESCRIPTION OF THE INVENTION

As mentioned above, the present invention relates to a process for preparing a formulation comprising an alkali metal salt selected from the group consisting of alkali metal bicarbonate salts, alkali metal carbonate salts, alkali metal sesquicarbonate salts and combinations thereof, wherein said process comprises the steps of:

(a1) melting a functionalizing agent to a temperature above the melting point of the functionalizing agent to obtain a melted functionalizing agent, and mixing the melted functionalizing agent with the alkali metal salt to obtain a paste-like composition; or (a2) mixing the functionalizing agent and the alkali metal salt to obtain a mixture, and heating the mixture to a temperature above the melting point of the functionalizing agent to melt the functionalizing agent within the mixture and to obtain a paste-like composition; or (a3) mixing the functionalizing agent and the alkali metal salt to obtain a mixture, and, to obtain the formulation, (b1) extruding or melt-extruding the paste-like composition obtained in step (a1) or (a2), or (b2) melt-extruding the mixture obtained in step (a3) at a temperature above the melting point of the functionalizing agent to melt the functionalizing agent to obtain a paste-like composition during extrusion, wherein the paste-like composition undergoing extrusion comprises at least 25% by weight of said alkali metal salt, based on the total weight of the composition undergoing extrusion, and the functionalizing agent.

Preferably, the paste-like composition undergoing extrusion comprises at least 30%, more preferably at least 50%, even more preferably at least 60%, even more preferably at least 65%, even more preferably at least 70%, or at least 80% by weight of the alkali metal salt.

Preferably, at steps (a1) or (a2) or (a3) of the process of the present invention, the weight ratio of functionalizing agent is at least 20, more preferably at least 25, even more preferably at least 30, and even more preferably at least 35 parts per 100 parts of alkali metal salt. In one embodiment, the ratio of the weight of the functionalizing agent to the weight of the alkali metal salt in the composition undergoing extrusion is greater than 0.25, or at least 0.3, or at least 0.4, or at least 0.5.

Preferably, at step (b1) or (b2) the formulation is in the form of a powder, filaments or granules, comprising alkali metal salt particles and functionalizing agent.

Preferably, the process of the present invention comprises after step (b1) or (b2) the step: (c) cooling the formulation to below the melting temperature of the functionalizing agent to obtain a cooled formulation in form of a powder, or cooled filaments or cooled granules of the alkali metal salt and the functionalizing agent.

In another embodiment, the process comprises melting the functionalizing agent, mixing the melted functionalizing agent with the alkali metal salt to obtain a first mixture, solidifying the first mixture, e.g., by cooling the first mixture, and extruding or melt-extruding the solidified first mixture.

In yet another embodiment, the process comprises (i) mixing the functionalizing agent with a solvent (e.g., water) to obtain a dispersion, (ii) heating the dispersion to a temperature greater than the melting temperature of the functionalizing agent so as to obtain an emulsion, (iii) mixing the emulsion with the alkali metal salt to obtain a paste-like composition, (iv) extruding the paste-like composition, and (v) optionally removing the solvent.

In yet another embodiment, the process comprises (i) mixing the functionalizing agent with a solvent (e.g., water) having a temperature greater than the melting temperature of the functionalizing agent so as to obtain an emulsion, (ii) mixing the emulsion with the alkali metal salt to obtain a paste-like composition, (iii) extruding the paste-like composition, and (iv) optionally removing the solvent.

Preferably, the functionalizing agent is selected from the group consisting of oils, fats, resin acids and esters and salts thereof, fatty acids and esters and salts thereof, soaps, waxes, shellac, poly(methyl)methacrylates, and combinations thereof.

Shellac is a natural resin produced by Laccifer lacca, and represents a mixture of aliphatic alicyclic hydroxyl acids and aleuritic and shelloic acids.

Poly(methyl)methacrylates suitable for use in the present invention include Eutragit® RL 30D from Evonik.

The melting point of the functionalizing agent is preferably at least 0° C., and/or is at most 140° C., preferably at most 90° C.

Preferably, the paste-like composition comprises alkali metal salt and 0.1-60% by weight, or 0.5-60% by weight, or 1-60% by weight, or 3-60% by weight, or 5-60% by weight, or 7-60% by weight, or 10-60% by weight, or 15-60% by weight, or 17%-60%, or 20%-57%, or even 23%-54% by weight of a fat, an oil, a resin acid or a salt thereof, a fatty acid or a salt thereof, a soap, or a wax, or a combination thereof as the functionalizing agent thereof, based on the total weight of the composition undergoing extrusion. If present in an amount of less than 0.1% by weight, or less than 0.3% by weight, or less than 0.5% by weight, or less than 1% by weight, or less than 3% by weight, or less than 5% by weight, or less than 7% by weight, or less than 10% by weight, or less than 15% by weight, or even less than 17% by weight, the functionalizing agent is less efficient in terms of the provision of a paste-like composition. More than 60% by weight of the functionalizing agent in the paste-like composition is disadvantageous for cost reasons.

Preferably, the functionalizing agent is, or comprises, an oil and/or a wax, and the oil comprises 12 to 22 carbons, and/or the wax comprises from 16 to 46 carbons.

An example for an oil used in the present invention is soybean oil which comprises linoleic acid, oleic acid, stearic acid, and palmitic acid. The soybean oil can also be hydrogenated (e.g., Drapex 392).

In a further preferred embodiment of the present invention, the functionalizing agent is, or comprises, a fatty acid that is a compound according to formula (I)

wherein R is a saturated or unsaturated C6 to C32 alkyl group, preferably a C12 to C18 alkyl group, more preferably a C12 to C16 alkyl group. Typical fatty acids used as the functionalizing agent in the present invention include stearic acid, isostearic acid, lauric acid and palmitic acid. Typical functionalizing agents used in the process of the present invention comprising a fatty acid are stearine and palm oil.

In a further preferred embodiment of the present invention, the functionalizing is or comprises an ester of a fatty acid. An example for an ester of a fatty acid used as functionalizing agent in the present invention is glycerol monstearate.

In a further preferred embodiment of the present invention, the functionalizing agent is, or comprises, a resin acid. Generally, the resin acid to be used as functionalizing agent in accordance with the present invention is one of the resin acids known in the art. The resin acids refer to mixtures of related carboxylic acids, preferably abietic acid, found in tree resins. Typically, resin acids have the basic skeleton of three fused rings with an empirical formula $C_{19}H_{29}COOH$. Preferred the resin acid is a tricyclic diterpene carboxylic acid, more preferable belonging to the abietane diterpene group. Preferred resin acids are abietic-type acids, e.g., selected from the group consisting of abietic acid (abieta-7,13-dien-18-oic acid), neoabietic acid, dehydroabietic acid, and palustric acid. Also suitable are pimaric-type acids, selected from the group consisting pimaric acid (pimara-8(14),15-dien-18-oic acid), levopimaric acid, or isopimaric acid. Such acids are available from natural sources or via chemical synthesis as e.g., known from US 2014/0148572 A1.

A derivative containing resin acids that may be used in accordance with the present invention is tall oil. Tall oil (also called liquid rosin) is obtained as a by-product of the Kraft process of wood pulp manufacture. Crude tall oil contains rosin, resin acids (mainly abietic acids and its isomers), fatty acids (mainly palmetic, and oleic), fatty alcohols, sterols and alkyl hydrocarbon derivatives. Most preferred abietic acid, pimaric acid and their salts, in particular the sodium salts, respectively are used as functionalizing agent in accordance with the present invention.

In a further preferred embodiment of the present invention, the functionalizing agent is, or comprises, a wax. Waxes are chemical compounds that are malleable near ambient temperatures. Characteristically, they melt above 45° C. to give a low viscosity liquid. Waxes are insoluble in water but soluble in organic, nonpolar solvents. All waxes are organic compounds, both synthetically and naturally occurring, which comprise or consist of long alkyl chains. Natural waxes may contain esters of carboxylic acids and long chain alcohols or mixtures of substituted hydrocarbons, such as long chain fatty acids and primary alcohols. Examples for natural waxes used as functionalizing agents in the present invention are beeswax and carnauba wax. Synthetic waxes such as paraffin wax, are long-chain hydrocarbons lacking functional groups. An example for a wax used in the present invention is beeswax, wherein a major component is the ester myricyl palmitate which is an ester of triacontanol and palmitic acid. Particularly preferred is beeswax. Another wax that can be used in the present invention comprises or consists of the compound having the structure $C_{24-54}-(C=O)-C_{24-54}$.

Preferably, the alkali metal salt used at step (a1) or (a2) or (a3) is made of particles, and said particles have a medium particle size (D50 in weight) of less than 300 µm, more preferably less than 200 µm, even more preferably less than 130 µm. The particles typically have a medium particle size (D50 in weight) of at least 10 µm, or at least 20 µm, or at least 30 µm, or at least 40 µm, or at least 50 µm. The medium particle size (D50 in weight) of the particles may range from 10-300 µm, or 20-200 µm, or 30-150 µm, or 50-130 µm. The particle size distribution can be determined according to ISO 13320. For example, the weight-average diameter D50 value can be measured by laser diffraction and scattering on a Malvern Mastersizer S particle size analyser using an He—Ne laser source having a wavelength of 632.8 nm and a diameter of 18 mm, a measurement cell equipped with a backscatter 300 mm lens (300 RF), and MS 17 liquid preparation unit, and an automatic solvent filtration kit ("ethanol kit") using ethanol saturated with the alkali metal salt (wet method).

Preferably, the alkali metal salt is a bicarbonate salt or a sesquicarbonate salt, in particular sodium bicarbonate or sodium sesquicarbonate. Particularly preferred is sodium bicarbonate.

Preferably, a third compound selected among a mineral compound, an organic compound, and mixtures thereof, is added to the alkali metal salt or to the functionalizing agent to obtain the paste-like composition.

Preferably, the mineral compound is silica, sodium silicate or sodium silicate hydrate, calcium carbonate, and/or wherein the organic compound is citric acid.

Preferably, at steps (a1) or (a2) or (a3) the weight ratio of functionalizing agent and alkali metal salt is at most 100 parts, preferably at most 70 parts, more preferably at most 60 parts, even more preferably at most 55 parts of the functionalizing agent per 100 parts of alkali metal salt.

In the process for preparing an alkali metal bicarbonate formulation by extrusion, all suitable extrusion procedures as known in the art can be used. Preferably, the extrusion is performed on a screw extruder, e.g., a single screw extruder or a twin screw extruder.

Preferably, the cooled filaments or granules are in a step (d) subsequently cut into pieces or grinded at a temperature below the melting temperature of the functionalizing agent.

The process of the present invention allows the control of the shape and size of the resulting formulation, which can be obtained as filaments or granules as described above. The ability to control shape and size of the alkali metal bicarbonate formulation of the present invention is advantageous with respect to the various applications of alkali metal bicarbonates as known in the art.

The present invention furthermore relates to an alkali metal salt formulation obtainable by an extrusion process as described above, wherein the formulation comprises alkali metal salt and a functionalizing agent, and wherein the formulation is in the form of a powder, filaments or granules, wherein the granules have a spherical, cubic or cylindrical shape. Preferably, the filaments or granules obtained from the process of the present invention have a diameter of at least 100 µm, preferably of at least 200 µm, more preferably of at least 500 µm, even more preferably of at least 1 mm.

Powders obtained from the extrusion process or by further milling the filaments or granules obtained from the extrusion process comprise particles with a medium particle size (D50 in weight) in the range of 1 µm to 2 mm, preferably from 10 µm to 500 µm. The particle size distribution can be determined according to ISO 13320.

The present invention furthermore relates to an alkali metal salt formulation (preferably obtainable by an extrusion process as described herein) comprising an alkali metal bicarbonate and a functionalizing agent as described herein. The formulation is preferably in the form of a powder, filaments or granules as described herein, wherein the granules have a spherical, cubic or cylindrical shape.

Preferably, the formulation comprises at least 40% by weight of an alkali metal bicarbonate, less than 10% by weight of an alkali metal carbonate, less than 10% by weight of water, and 0.1-60% by weight, or 0.5-60% by weight, or 1-60% by weight, or 3-60% by weight, or 5-60% by weight, or 7-60% by weight, or 10-60% by weight, or 15-60% by weight, or 17%-60%, or 20%-57%, or even preferably 23%-54% by weight of a resin acid or an ester or a salt thereof, a fatty acid or an ester or a salt thereof, or a wax, each based on the total amount of the alkali metal salt formulation.

More preferably, the formulation comprises at least 45%, even more preferably at least 50%, even more preferably at least 60%, even more preferably at least 65%, even more preferably at least 70% by weight of the alkali metal bicarbonate, based on the total amount of the alkali metal salt formulation.

Preferably, the formulation is in the form of filaments or granules having a diameter of at least 100 µm, preferably of at least 200 µm, more preferably of at least 500 µm, even more preferably of at least 1 mm.

Preferably, the formulation is in the form of filaments or granules having a diameter of at most 100 mm, preferably of at most 50 mm, more preferably of at most 5 mm, even more preferably of at most 2 mm. The length-to-diameter ratio of the filaments or granules may range from about 0.4 to about 4. Preferably, the alkali metal salt in the formulation of the present invention is a bicarbonate or a sesquicarbonate salt, particularly sodium bicarbonate or sodium sesquicarbonate. Particularly preferred is sodium bicarbonate.

The formulation obtainable by the process of the invention shows an excellently increased dissolution time. The formulation of the present invention shows a dissolution time of at least 30 seconds, preferably at least 100 seconds, more preferably at least 200 seconds.

The formulation obtainable from the processes of the invention also show excellent $CO_2$ release properties. $CO_2$ release of the formulation obtained from the process of the present invention begins at a temperature of at least 120° C., preferably at a temperature of at least 125° C., more preferably at a temperature of at least 130° C., even more preferably at a temperature of at least 135° C., and particularly preferably at a temperature of at least 140° C., as determined by the TGA method described above. The $CO_2$ release typically has its maximum at a temperature of at least 150° C., preferably at a temperature of at least 155° C., more preferably at a temperature of at least 160° C., even more preferably at a temperature of at least 165° C., and particularly preferably at a temperature of at least 170° C., as determined by the TGA method described above.

The advantageous properties of the formulation as described above and as obtainable by the process of the invention make it possible to envisage various applications for this alkali metal bicarbonate formulation. The present invention therefore further relates to the use of the alkali metal salt formulation obtainable from the process described above as detergent, as blowing or foaming agent for polymers, as agent for pharmaceutical applications, as exfoliating agent, as anti-parasitic agent, as cosmetic agent such as deodorizing agent, as leavening agent for food and feed, as agent for flue gas cleaning, as food and feed supplement additive or food and feed pH buffer, in particular for aquatic animals or for fish.

The following examples are given by way of non-limiting illustration of the present invention, and variations thereof that are readily accessible to a person skilled in the art.

EXAMPLES

Example 1

Different weight ratios of palmoil, stearine and beeswax in relation to sodium bicarbonate were tested with respect to their ability to form paste-like compositions suitable for extrusion. The compositions were produced according to the following procedure.

Palmoil, stearine and beeswax, respectively, were heated in a magnetically stirred, double-jacketed glass beaker to a temperature of 65° C. Sodium bicarbonate (SOLVAY BICAR® TEC 0/13) was added to the melted functionalizing agent and mixed by means of stirring until a homogenous composition was formed.

The respective compositions 1 to 5 are shown in the following Table 1.

TABLE 1

| Composition | Functionalizing agent (FA) | Functionalizing agent [g] | NaHCO$_3$ [g] | Weight ratio FA:NaHCO$_3$ |
|---|---|---|---|---|
| 1 | Palmoil | 10 | 40 | 0.25 |
| 2 | Palmoil | 20 | 40 | 0.5 |
| 3 | Stearine | 20 | 80 | 0.25 |
| 4 | Beeswax | 10 | 40 | 0.25 |
| 5 | Beeswax | 20 | 40 | 0.5 |

The compositions 1 to 5 were then transferred into a syringe of 20 mm diameter and an exit orifice (nozzle) of 1.8 mm internal diameter, and extrusion was performed at room temperature (20-30° C.) or at elevated temperatures of 60-65° C. The observations as indicated in the following Table 2 were made.

TABLE 2

| Formulation | Temperature [° C.] | Observations |
|---|---|---|
| 1 | room temperature | Extrusion not possible because composition was too hard, i.e., not paste-like as defined above |
| 1 | 60-65° C. | Extrusion not possible because composition was too hard, i.e., not paste-like |
| 2 | room temperature | Extrusion worked well |
| 3 | 60-65° C. | Extrusion worked well |
| 4 | 60-65° C. | Extrusion not possible because paste was too hard, i.e., not paste-like as defined above |
| 5 | 60-65° C. | Extrusion worked well |

The above results illustrate that a weight ratio of functionalizing agent:alkali metal salt of greater than 0.25 is preferred in order to obtain a paste-like composition that is suitable for extrusion.

Example 2

A formulations of sodium bicarbonate and stearine (formulation 1) and a formulation of sodium bicarbonate and beeswax (formulation 2) were prepared according to the following procedure.

20 g of stearine (formulation 1) and beeswax (formulation 2), respectively, were heated in a magnetically stirred, double-jacketed glass beaker to a temperature of 65° C. 80 g (formulation 1) or 40 g (formulation 2) sodium bicarbonate (SOLVAY BICAR® TEC 0/13) was added to the melted FA and mixed until a homogenous paste-like composition was formed. The paste-like composition was transferred into a syringe of 20 mm diameter and an exit orifice (nozzle) of 1.8 mm internal diameter, and extrusion was performed resulting in the formation of filaments of the sodium bicarbonate and the respective plasticizer (diameter 1.8 mm).

The composition of formulations 1 and 2 is given in the following Table 3:

TABLE 3

| Formulation | Functionalizing agent (FA) | Concentration [g of FA on kg formulation] | NaHCO$_3$ [g/kg] | Na$_2$CO$_3$ [g/kg] |
|---|---|---|---|---|
| 1 | Stearine | 278.27 | 709.82 | 11.91 |
| 2 | Beeswax | 513.33 | 470.82 | 15.85 |

Dissolution time and CO$_2$ release temperature of formulations 1 and 2 were determined as described above. The results are given in the following Table 4.

TABLE 4

| Formulation | Functionalizing agent | Dissolution Time [s] | TGA CO$_2$ release beginning temperature [° C.] | TGA CO$_2$ release maximum temperature [° C.] |
|---|---|---|---|---|
| 1 | Stearine | >1772 | 162.3 | 175.4 |
| 2 | Beeswax | >2017 | 145.8 | 174.8 |

TGA method: 35 to 250° C./10° C./min

The results show that high dissolution times of more than 1770 seconds can be achieved when stearine or beeswax is used as the functionalizing agent in the process of the present invention.

The CO$_2$ release begins at a temperature of approximately 146 and 162° C., respectively, and has its maximum at approximately 175° C. for both functionalizing agents.

Example 3: Decomposition Kinetics

The following Table 5a shows 16 sodium bicarbonate products (entries 1 to 16) comprising different functionalizing agents that were obtained by the extrusion process according to the invention.

The sodium bicarbonate products according to entries 1, 3 to 10 of Table 5a were obtained by means of a continuous mixing/extrusion process. Mass flow amounts of bicarbonate were between 10 and 30 kg/h. Functionalizing agents were added as indicated in the Table 5a (entries 3 10). The temperature applied in the process was between 30 and 100° C. The residence time was between 2 to 20 minutes.

The sodium bicarbonate product according to entry 2 of Table 5a was obtained by means of the above described extrusion process, wherein the resulting product was further milled using a Planetary ball mill.

The sodium bicarbonate products according to entries 11 to 16 of Table 5a were obtained by means of a continuous mixing/extrusion process, which was carried out as described above for the products according to entries 3 to 10. The resulting products were further milled using a Planetary ball mill, providing the products according to entries 11 to 16 of Table 5a.

The reference product is SOLVAY BICAR® TEC 0/13 (Table 5, entry 17).

TABLE 5a

| Entry | Process | Functionalizing Agent (FA) | Content FA [wt. %] |
|---|---|---|---|
| 1 | Extrusion | Stearic acid | 20 |
| 2 | Extrusion + Milling | Stearic Acid | 20 |
| 3 | Extrusion | Beeswax | 10 |
| 4 | Extrusion | Glycerol Monstearate | 10 |
| 5 | Extrusion | Stearic acid | 5 |
| 7 | Extrusion | Carnauba wax | 10 |
| 7 | Extrusion | Hydrogenated soybean oil (Drapex 392) | 5 |
| 8 | Extrusion | Lauric acid | 10 |
| 9 | Extrusion | Isostearic acid | 10 |
| 10 | Extrusion | Eutragit RL 30D | 3 |
| 11 | Extrusion + Milling | Beeswax | 10 |
| 12 | Extrusion + Milling | Glycerol Monstearate | 10 |
| 13 | Extrusion + Milling | Stearic acid | 10 |
| 14 | Extrusion + Milling | Carnauba wax | 10 |
| 15 | Extrusion + Milling | Eutragit RL 30D | 4 |
| 16 | Extrusion + Milling | Lauric acid | 10 |
| 17 | BICAR ® | — | — |

Decomposition kinetics of the sodium bicarbonate products indicated in Table 5a were measured by means of a thermal balance analyzer (Moisture Analyzer Mettler Toledo HX204). 2 to 3 g of the product was uniformly spread on an aluminum pan, and put in the thermal balance analyzer, which was rapidly heated to the desired temperature of 140° C.

t95% [s] is the decomposition time at a temperature T (i.e., 140° C.) where 95% of the final loss is reached at the desired temperature; a [% wt/s] is the line slope between the point of 15% and 95% of the decomposition kinetics at a temperature T (i.e., 140° C.).

The results are given in the following Table 5b.

TABLE 5b

| Entry | 140° C. t95 [s] | 140° C. a [% wt/s] |
|---|---|---|
| 1 | 2145 | 0.015 |
| 2 | 2480 | 0.008 |
| 3 | 2430 | 0.014 |
| 4 | 2540 | 0.014 |
| 5 | 2350 | 0.017 |
| 6 | 3560 | 0.009 |
| 7 | 2435 | 0.013 |
| 8 | 2935 | 0.014 |
| 9 | 5005 | 0.007 |
| 10 | 1215 | 0.027 |
| 11 | 2715 | 0.012 |
| 12 | 1635 | 0.021 |
| 13 | 1330 | 0.025 |
| 14 | 2480 | 0.013 |
| 15 | 1335 | 0.025 |
| 16 | 2035 | 0.017 |
| 17 | 1070 | 0.030 |

All the sodium bicarbonate products comprising a functionalizing agent show increased gas release times at a temperature of 140° C. compared to the reference SOLVAY BICAR® TEC 0/13.

$CO_2$ release temperatures of the products according to entries 5 to 7 and 17 of Table 5a were determined as described above. The results are shown in the following Table 5c:

TABLE 5c

| Entry | TGA $CO_2$ release beginning temperature [° C.] | TGA $CO_2$ release maximum temperature [° C.] |
|---|---|---|
| 5 | 157 | 164 |
| 6 | 152 | 171 |
| 7 | 131 | 165 |
| 17 | 120 | 152 |

TGA method: 35 to 250° C./10° C./min

The results show that both the $CO_2$ release beginning temperature and the $CO_2$ release maximum temperature are increased in the products comprising a functionalizing agent compared to the SOLVAY BICAR® TEC 0/13 standard which does not comprise a functionalizing agent.

The invention claimed is:

1. A process for preparing a formulation comprising an alkali metal salt selected from the group consisting of alkali metal bicarbonate salts, alkali metal carbonate salts, alkali metal sesquicarbonate salts and combinations thereof, wherein said process comprises the steps of:
   (a1) melting a functionalizing agent to a temperature above the melting point of the functionalizing agent to obtain a melted functionalizing agent, and mixing the melted functionalizing agent with the alkali metal salt to obtain a paste-like composition; or
   (a2) mixing the functionalizing agent and the alkali metal salt to obtain a mixture, and heating the mixture to a temperature above the melting point of the functionalizing agent to melt the functionalizing agent within the mixture and to obtain a paste-like composition; or
   (a3) mixing the functionalizing agent and the alkali metal salt to obtain a mixture, and, to obtain the formulation,
   (b1) extruding or melt-extruding the paste-like composition obtained in step (a1) or (a2), or
   (b2) melt-extruding the mixture obtained in step (a3) at a temperature above the melting point of the functionalizing agent to melt the functionalizing agent to obtain a paste-like composition during extrusion,
   wherein the paste-like composition undergoing extrusion comprises at least 25% by weight of said alkali metal salt, based on the total weight of the composition undergoing extrusion, and the functionalizing agent,
   wherein the functionalizing agent is selected from the group consisting of oils, fats, resin acids and esters and salts of oils, fats, resin acids and esters, fatty acids, fatty acid esters, and fatty acid salts other than calcium stearate, waxes, shellac, poly(methyl)methacrylates, and combinations thereof, wherein the waxes comprise from 16 to 46 carbons,
wherein at steps (a1) or (a2) or (a3), the weight ratio of the functionalizing agent is at least 30 parts per 100 parts of the alkali metal salt.

2. The process of claim 1, wherein at steps (a1) or (a2) or (a3), the weight ratio of the functionalizing agent is at least 35 parts per 100 parts of the alkali metal salt;
and wherein at step (b1) or (b2), the formulation is in form of a powder, filaments or granules, comprising alkali metal salt particles and the functionalizing agent.

3. The process of claim 1, comprising after step (b1) or (b2) the step:
(c) cooling the formulation to below the melting temperature of the functionalizing agent to obtain a cooled formulation in form of a powder, or cooled filaments or cooled granules of the alkali metal salt and the functionalizing agent.

4. The process according to claim 2, wherein the filaments or granules are further milled.

5. The process of claim 1, wherein the melting point of the functionalizing agent is at least 0° C., and is at most 140° C.

6. The process according to claim 1, wherein the functionalizing agent is, or comprises, an oil and/or a wax, and the oil comprises 12 to 22 carbons.

7. The process according to claim 1, wherein the functionalizing agent is, or comprises, a fatty acid that is a compound according to formula (I)

R—COOH  (I)

wherein R is a saturated or unsaturated C6 to C32 alkyl group.

8. The process according to claim 1, wherein the functionalizing agent is, or comprises, a resin acid that is a tricyclic diterpene carboxylic acid.

9. The process according to claim 1, wherein the functionalizing agent is, or comprises, beeswax.

* * * * *